(12) United States Patent
Trimberger

(10) Patent No.: US 7,143,295 B1
(45) Date of Patent: Nov. 28, 2006

(54) METHODS AND CIRCUITS FOR DEDICATING A PROGRAMMABLE LOGIC DEVICE FOR USE WITH SPECIFIC DESIGNS

(75) Inventor: Stephen M. Trimberger, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 860 days.

(21) Appl. No.: 10/199,535

(22) Filed: Jul. 18, 2002

(51) Int. Cl.
- G06F 11/30 (2006.01)
- G06F 12/14 (2006.01)
- H04L 9/32 (2006.01)

(52) U.S. Cl. .............. 713/189; 713/193; 716/16; 716/17

(58) Field of Classification Search ............. 713/189, 713/193; 716/16, 17
See application file for complete search history.

(56) References Cited

U.S. PATENT DOCUMENTS

| | | |
|---|---|---|
| 3,995,261 A | 11/1976 | Goldberg |
| 4,020,469 A | 4/1977 | Manning |
| 4,700,187 A | 10/1987 | Furtek |
| 4,899,067 A | 2/1990 | So et al. |
| 5,459,342 A | 10/1995 | Nogami et al. |
| 5,485,102 A | 1/1996 | Cliff et al. |
| 5,497,381 A * | 3/1996 | O'Donoghue et al. ...... 714/745 |
| 5,498,975 A | 3/1996 | Cliff et al. |
| 5,592,102 A | 1/1997 | Lane et al. |
| 5,777,887 A | 7/1998 | Marple et al. |
| 5,889,413 A | 3/1999 | Bauer |
| 5,914,616 A | 6/1999 | Young et al. |
| 5,933,023 A | 8/1999 | Young |
| 6,166,559 A | 12/2000 | McClintock et al. |
| 6,167,558 A | 12/2000 | Trimberger |
| 6,185,724 B1 * | 2/2001 | Ochotta ................. 716/16 |
| 6,215,327 B1 * | 4/2001 | Lyke ..................... 326/41 |
| RE37,195 E | 5/2001 | Kean |
| 6,344,755 B1 | 2/2002 | Reddy et al. |
| 6,356,514 B1 | 3/2002 | Wells et al. |
| 6,530,071 B1 * | 3/2003 | Guccione et al. ........ 716/17 |
| 6,687,884 B1 * | 2/2004 | Trimberger ............. 716/4 |
| 6,754,862 B1 * | 6/2004 | Hoyer et al. ............ 714/725 |
| 6,817,006 B1 * | 11/2004 | Wells et al. ............ 716/16 |
| 2001/0037458 A1 * | 11/2001 | Kean ..................... 713/193 |

OTHER PUBLICATIONS

U.S. Appl. No. 09/253,401, Trimberger.
U.S. Appl. No. 09/724,652, Pang et al.
U.S. Appl. No. 10/104,324, Wells et al.
U.S. Appl. No. 10/112,838, Trimberger.
Applied Cryptography Second Edition: protocols, algorithms, and source code in C copyright 1996 by Bruce Schneier, published by John Wiley & Sons, Inc., pp. 265-278, and pp. 456.
U.S. Appl. No. 09/924,365, filed Aug. 7, 2001, Ling et al.
John Emmert et al.; "Dynamic Fault Tolerance in FPGAs via Partial Reconfiguration"; Annual IEEE Symposium on Field-Programmable Custom Computing Machines; Apr. 17, 2000; pp. 165-174.
John M. Emmert et al.; "Incremental Routing in FPGAs"; ASIC Conference 1998. Proceedings, Eleventh Annual IEEE International; Rochester, NY; Sep. 13-16, 1998; pp. 217-221.

* cited by examiner

*Primary Examiner*—Kambiz Zand
*Assistant Examiner*—Samson Lemma
(74) *Attorney, Agent, or Firm*—Arthur Joseph Behiel; Thomas Ward; Kim Kanzaki

(57) ABSTRACT

Disclosed are methods and circuits that enable PLD vendors to dedicate PLDs for use with one or more specified designs. The PLD is programmed to store an indicator related to a specific design, for example, a hash function of the design, and to compare an indicator calculated within the PLD from an expression of the design (such as a bitstream) with the stored indicator. Only if the comparison matches is the PLD programmed to implement the design.

12 Claims, 5 Drawing Sheets

METHODS AND CIRCUITS FOR DEDICATING A PROGRAMMABLE LOGIC DEVICE FOR USE WITH SPECIFIC DESIGNS

FIELD OF THE INVENTION

The present invention relates to programmable logic devices, and more particularly to methods and circuits for enabling PLD vendors to dedicate PLDs for use with specified designs.

BACKGROUND

Programmable logic devices (PLDs), such as field-programmable gate arrays (FPGAs), are user-programmable integrated circuits that can be programmed to implement user-defined logic circuits. In a typical architecture, an FPGA includes an array of configurable logic blocks (CLBs), a collection of programmable input/output blocks (IOBs), and a hierarchy of programmable routing resources for interconnecting the CLBs and IOBs. Additional resources, such as multipliers, memory, and application-specific circuits may also be included. Loading a configuration bitstream into configuration memory cells of the FPGA customizes these CLBs, IOBs, programmable routing resources, and other resources. An exemplary FPGA architecture is described by Young in U.S. Pat. No. 5,933,023, entitled "FPGA Architecture Having RAM Blocks with Programmable Word Length and Width and Dedicated Address and Data Lines," which is incorporated herein by reference.

PLDs are growing ever larger as vendors attempt to satisfy customer demand for devices capable of performing ever more complex tasks. Unfortunately, as die size increases, so too does the probability of finding a defect on a given die. The process yield therefore decreases with PLD complexity, making already expensive PLDs still more expensive.

PLDs are not design-specific, but instead afford users (e.g., circuit designers) the ability to instantiate an almost unlimited number of circuit variations. Not knowing in advance the purpose to which a given PLD will be dedicated places a heavy burden on the quality and reliability of the PLD because PLD vendors must verify the functionality of any feature that might be used. To avoid disappointing customers, PLD manufacturers discard PLDs that include even relatively minor defects.

PLD defects can be categorized in two general areas: gross defects that render the entire PLD useless or unreliable, and localized defects that affect a relatively small portion of the PLD. Sometimes, for large die, close to two thirds of the die on a given wafer may be discarded because of localized defects. Considering the costs associated with manufacturing large integrated circuits, discarding a large percentage of PLD die has very significant adverse economic impact on PLD manufacturers. In light of this problem, Xilinx, Inc., has developed methods for salvaging some defective PLDs.

Xilinx, Inc., tests defective PLDs to determine their suitability for implementing selected customer designs that may not require the resources impacted by the defects. If the device is found to be unsuitable for one design, the device may be tested for additional designs. These test methods typically employ tests derived from a user design and instantiated on the PLD of interest to verify resources required for the design. The tests allow a PLD vendor to verify the suitability of a device for a given design without requiring the vendor to understand the user design. U.S. patent application Ser. No. 10/104,324 entitled "APPLICATION—SPECIFIC TESTING METHODS FOR PROGRAMMABLE LOGIC DEVICES," by Robert W. Wells, et al. is incorporated herein by reference. As mentioned in the above-referenced Wells et al. application, once an ASIC candidate is verified for a particular customer design, the PLD manufacturer may want to prevent customers from using the PLD for other designs. The present application details methods and circuits that enable PLD vendors to dedicate PLDs for use with specified designs.

DETAILED DESCRIPTION

Figure 1:
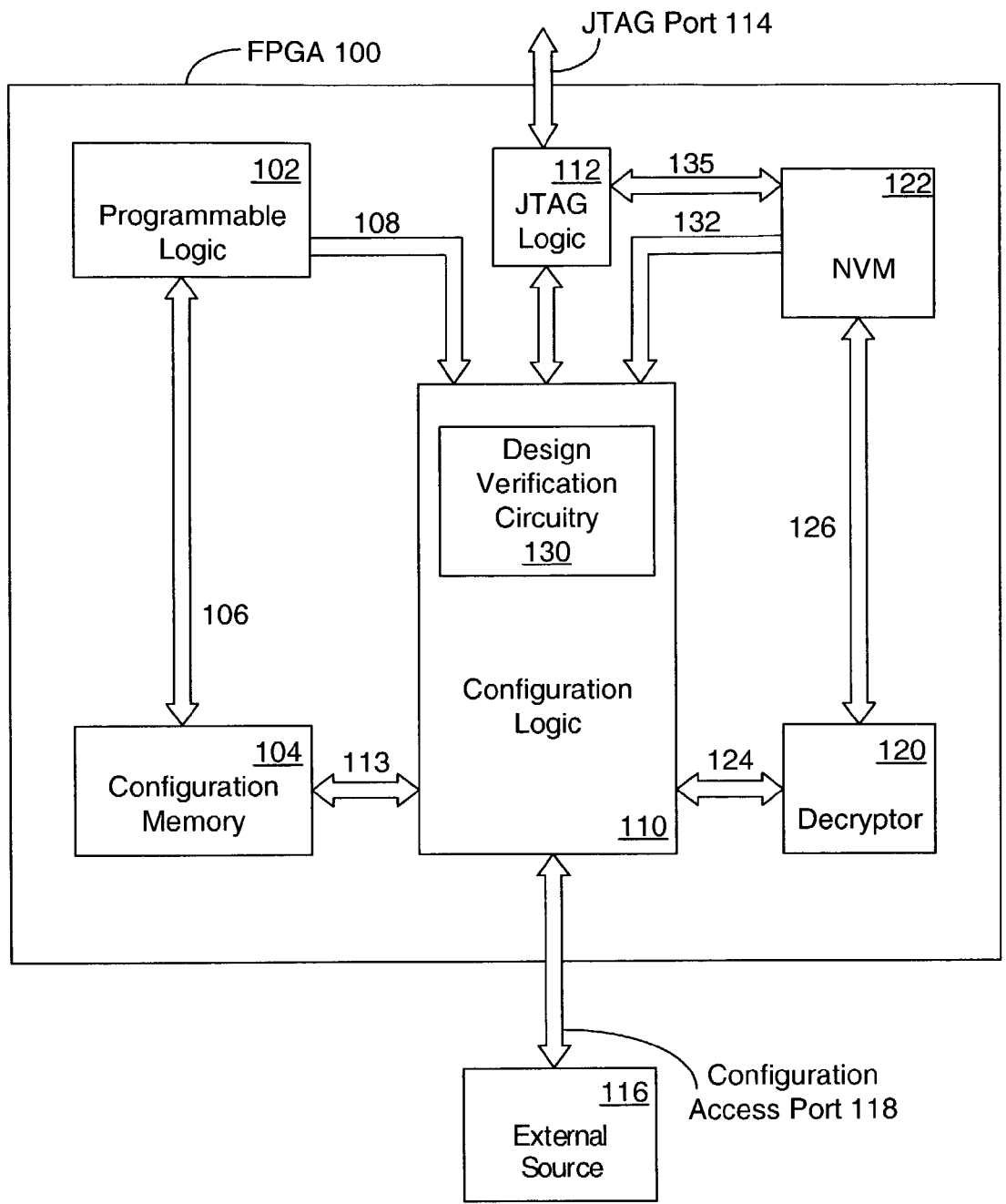
FIG. 1 depicts an FPGA 100 that can be programmed to accept only specific expressions of customer designs.

FIG. 1 depicts an FPGA 100 that can be programmed to accept only specific expressions of customer designs. FPGA 100 conventionally includes a collection of programmable logic 102, the function of which is controlled by some configuration memory 104 via a distributed set of logic control lines 106. In some conventional products (e.g., the Xilinx XC6200 FPGA), FGPA 100 includes a bus 108 by which programmable logic 102 causes some configuration logic 110 to send programming information to configuration memory 104. Such a structure is described by Kean in U.S. Reissue Patent RE37,195, entitled "Programmable Switch for FPGA Input/Output Signals," which is incorporated herein by reference.

Also conventional, FPGA 100 includes a JTAG logic block 112 through which configuration logic 110 interfaces with a JTAG port 114. These JTAG resources are especially intended for testing the board on which FPGA 100 will be placed. JTAG logic block 112 implements the IEEE standard 1532, which is a superset of the IEEE standard 1149.1. JTAG facilitates debugging of a design at the board level.

Configuration Logic block 110 receives an expression of a customer-specific design as a bitstream that includes instructions and data. Configuration logic 110 processes the data according to the instructions to load configuration memory 104, via a bus 113, as appropriate to instantiate the desired logic design in programmable logic 102. Configuration logic 110 can receive design expressions via the JTAG port, but more commonly receives such expressions from some external data source 116 (e.g., a PROM) via a dedicated configuration access port 118.

Anyone having access to the configuration bitstream for a particular design can easily copy the design. FPGA 100 is therefore equipped with a decryptor 120 and associated non-volatile memory 122, which together enable users to configure FGPA 100 using encrypted configuration data.

Briefly, configuration logic 110 conveys encrypted bitstreams to decryptor 120 via a bus 124. Decryptor 120 then accesses one or more decryption keys stored in non-volatile memory 122 over a memory access bus 126, employs the key or keys to decrypt the bitstream, and then returns the decrypted bitstream to configuration logic 110 via bus 124. For a more detailed treatment of bitstream decryption and other configuration-data security issues, see U.S. patent application Ser. No. 10/112,838 entitled "Methods and Circuits for Protecting Proprietary Configuration Data for Programmable Logic Devices," by Stephen M. Trimberger, and U.S. patent application Ser. No. 09/724,652, entitled "Programmable Logic Device With Decryption Algorithm and Decryption Key," by Pang et al., both to which are incorporated herein by reference.

In the depicted embodiment, configuration logic 110 includes design-verification circuitry 130 that can be configured to admit only specified expressions of user designs. For example, an FPGA deemed defective that is nevertheless fully functional with a given user design can be dedicated for use with that design. Once configured to accept only a specific user design, FPGA 100 will reject all other designs, and will thus be rendered an application-specific integrated circuit. The above-mentioned reference to Wells et al. describes some methods of identifying defective FPGAs that might nevertheless function when programmed with specific user designs.

Design verification circuitry 130 connects to non-volatile memory 122 via a bus 132. If FPGA 100 is to be dedicated for use with a specific design, a unique identifier (e.g., a digital signature) corresponding to the design is stored in non-volatile memory 122. The unique identifier is, in one embodiment, a hash function of all or part of the bitstream that defines the accepted design. A field within non-volatile memory 122 is programmed with the result of the hash function, typically by the FPGA vendor. When FPGA 100 is dedicated for use with a specific design, design verification circuitry 130 performs the hash function on each incoming configuration bitstream and only enables FPGA 100 if the hash result matches the one stored in memory 122. A bus 135 carries data, addresses, and control signals to write to and read from memory 122. In other embodiments, memory 122 is loaded through another port. Memory 122 can be any form of available non-volatile memory, but preferable is one-time programmable.

Figure 2:
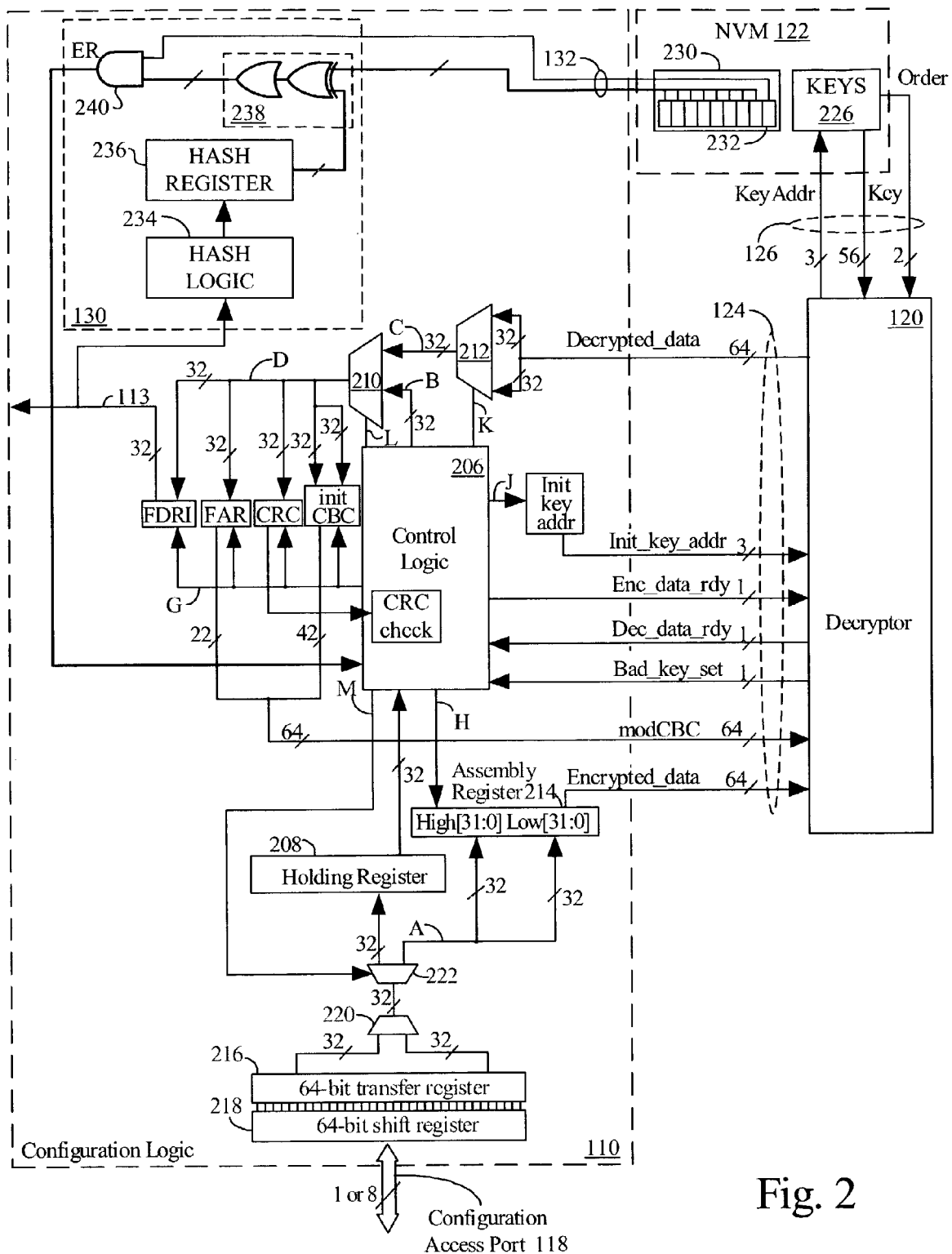
FIG. 2 is a block diagram detailing aspects of FPGA 100 (FIG. 1) of particular relevance to one embodiment of the invention.

FIG. 2 is a block diagram detailing aspects of FPGA 100 (FIG. 1) of particular relevance to one embodiment of the invention. FIG. 2 includes expanded views of memory 122 and configuration logic unit 110, including design verification circuitry 130.

One potential attack on a design in an encrypted bitstream is to change the frame address register (starting address) in an encrypted bitstream so that, when decrypted, the bitstream is loaded into a portion of the FPGA that may be observed when the FPGA is being used. For example, in some designs the content of the block RAM may be observed. In all designs the configuration of the input/output ports is observable, so the configuration bits associated with the input/output ports can be determined. An attacker may therefore use a system of "design relocation" in which a PLD is successively reprogrammed with a design of interest so that each programming causes different portions of the design to occupy observable portions of the PLD. The successive observations can then be combined to learn the contents of the unencrypted bitstream.

Configuration logic 110 includes structures to support optional encryption and to prevent design relocation. As shown in FIG. 2, configuration logic 110 includes a holding register 208, control logic 206, a collection of configuration registers (FDRI, FAR, CRC, and init CBC are shown), interface multiplexers 210 and 212, a 64-bit assembly register 214, and a pair of registers 216 and 218.

Register 218 is a 64-bit shift register that receives configuration data from configuration access port 118. Configuration access port 118 can be a single pin for one-bit-wide data or eight pins for eight-bit-wide data. Configuration data is loaded into register 218 until register 218 is full. The 64 bits are then shifted in parallel into 64-bit transfer register 216. From there, a multiplexer 220 alternately selects right and left 32-bit words, and a demultiplexer 222 moves the data 32 bits at a time into either holding register 208 or alternately into High and Low portions of assembly register 214, as controlled by a control line M from control logic 206. When loading of the bitstream begins, line M and a clock signal (not shown) cause multiplexer 220 and demultiplexer 222 to move data from 64-bit transfer register 216 to holding register 208. From there these words are applied to control logic 206. If the word is a header, control logic 206 interprets the word. If the op code of the word indicates the data to follow are to be written unencrypted, control logic 206 places an address on a bus G to select a register, places a signal on a line L to cause multiplexer 210 to connect a bus B to a bus D, and applies the following word on bus B. On the next clock signal (clock signals are not shown), the data on bus D are loaded into the addressed register.

In some embodiments, the bitstream for a design or a subdesign comprises two portions, a data portion representing the user's design, which can be encrypted or not, and a control portion controlling bitstream loading (for example giving addresses of columns in the FPGA into which successive portions of the bitstream are to be loaded, providing a CRC code for checking reliability of the loading operation, and a starter number for cipher block chaining (CBC), a technique that prevents a "dictionary attack" where the decrypted data can be deduced from the frequency of occurrence of the encrypted data). Such embodiments are detailed in the above-referenced application to Pang et al. In other embodiments, used when the order of addresses in which configuration data is loaded may be useful to an attacker in analyzing the design, the address of the configuration data is also encrypted, but other control information in the configuration bitstream remains unencrypted. This too is detailed in the above-referenced Pang et al. application.

A modified CBC value formed from (1) the original CBC value stored in the init CBC register and (2) the initial frame address stored in the FAR (frame-address register) register is available to decryptor 120. In one embodiment, the initial frame address in the FAR register uses no more than 32 bits while the init CBC value uses 64 bits. In the embodiment of FIG. 2, the 64-bit bus providing the modified CBC value includes 22 bits from the frame address register FAR and 42 bits from the init CBC register. This value depends upon where configuration data will be loaded. If an attacker were to try to load encrypted data into a different place by changing the contents of the FAR register, the modCBC value fed to decryptor 120 would also change.

The decryption process begins when control logic 206 receives an op code command to decrypt a number of words of configuration data. Control line M causes multiplexer 222 to apply data from transfer register 216 to bus A leading to assembly register 214. Control bus H alternately connects bus A to the High[31:0] and Low[31:0] portions of encrypted data register 214 to form a 64-bit word to be decrypted. Control logic 206 then asserts the Enc_data_rdy signal, which causes decryptor 120 to decrypt the data in register 214.

To perform the decryption, decryptor 120 applies a key address KeyAddr on bus 126 to a key memory 226 within memory 122. This causes key memory 226 to return a 56-bit key in that address on the 56-bit Key lines. It also causes key memory 226 to return two additional bits "Order" also stored in the key data at that address. For the first decryption key, these two bits must indicate that this is a first key or an only key. If not, decryptor 120 asserts the Bad_key_set signal, which causes control logic 206 to abort the configuration operation. If these two bits indicate the key is a first or only key, decryptor 120 performs the decryption, using for example the well-known DES algorithm. The DES algorithm is described by Bruce Schneier in "Applied Cryptography Second Edition: protocols, algorithms, and source code in C" copyright 1996 by Bruce Schneier, published by John Wiley & Sons, Inc., pages 265–278, which is incorporated herein by reference.

If there is more than one key, decryptor 120 then gets the key at the next address in key memory 226 and checks to see whether the two Order bits indicate it is a middle or last key. If not, the Bad_key_set signal is asserted and the configuration is aborted; if so, decryption is performed. If it is a middle key, another round of decryption is done. If it is the last key, decryptor 120 forms the XOR function of the decrypted word and the value modCBC. Decryptor 24 then places the resultant value on the 64-bit Decrypted_data bus and asserts the Dec_data_rdy signal, which causes control logic 206 to place signals on control line K that cause multiplexer 212 to break the 64-bit word into two sequential 32-bit words. Control logic 206 places a signal on line L to cause multiplexer 210 to forward the 32-bit words of decrypted data to bus D. Control logic 206 also places address signals on bus G to address frame data input register FDRI. The next clock signal moves the decrypted data to bus 113 where it is loaded into a frame register (not shown). When full, the content of the frame register is shifted into configuration memory 104 (FIG. 1) at the address indicated in frame address register FAR.

The modCBC value is used only once in the decryption operation. Subsequent 64-bit words of encrypted data are decrypted and then chained using the previously decrypted data for the XOR operation. (The value stored in frame address register FAR is also used only once to select a frame address. Subsequently, the frame address is simply incremented every time a frame is filled.)

As noted above, design-verification circuitry 130 can be configured to admit only specified expressions of user designs. Defective devices that are nevertheless fully functional with a given user design can therefore be dedicated for use with that design. In the depicted embodiment, memory 122 includes a register 230 adapted to store an identifier unique to the specific design. Register 230 also includes an extra bit 232 that is programmed to include a logic one if FGPA 100 is dedicated for use with a specified design. In this embodiment, the logic one is the programmed state of the bit for a one-time programmable memory. If not, an inverter can be added between memory cell 232 and AND gate 240.

Design-verification circuitry 130 includes hash logic 234, a hash register 236, comparison logic 238 (represented as an XOR gate followed by an OR gate), and an AND gate 240. The output of AND gate 240 connects to control logic 206 via an error line ER. A logic one on error line ER causes control logic 206 to abort the configuration operation. In this case, control logic 206 can clear the configuration memory by overwriting it with all zeroes. One input of AND gate 240 connects to bit 232 in memory 122. Programming bit 232 to store a logic zero prevents gate 240 from ever asserting an error signal on line ER, and consequently disables design-verification circuitry 130. In that state, the FGPA is not limited to a given design.

Figure 3:
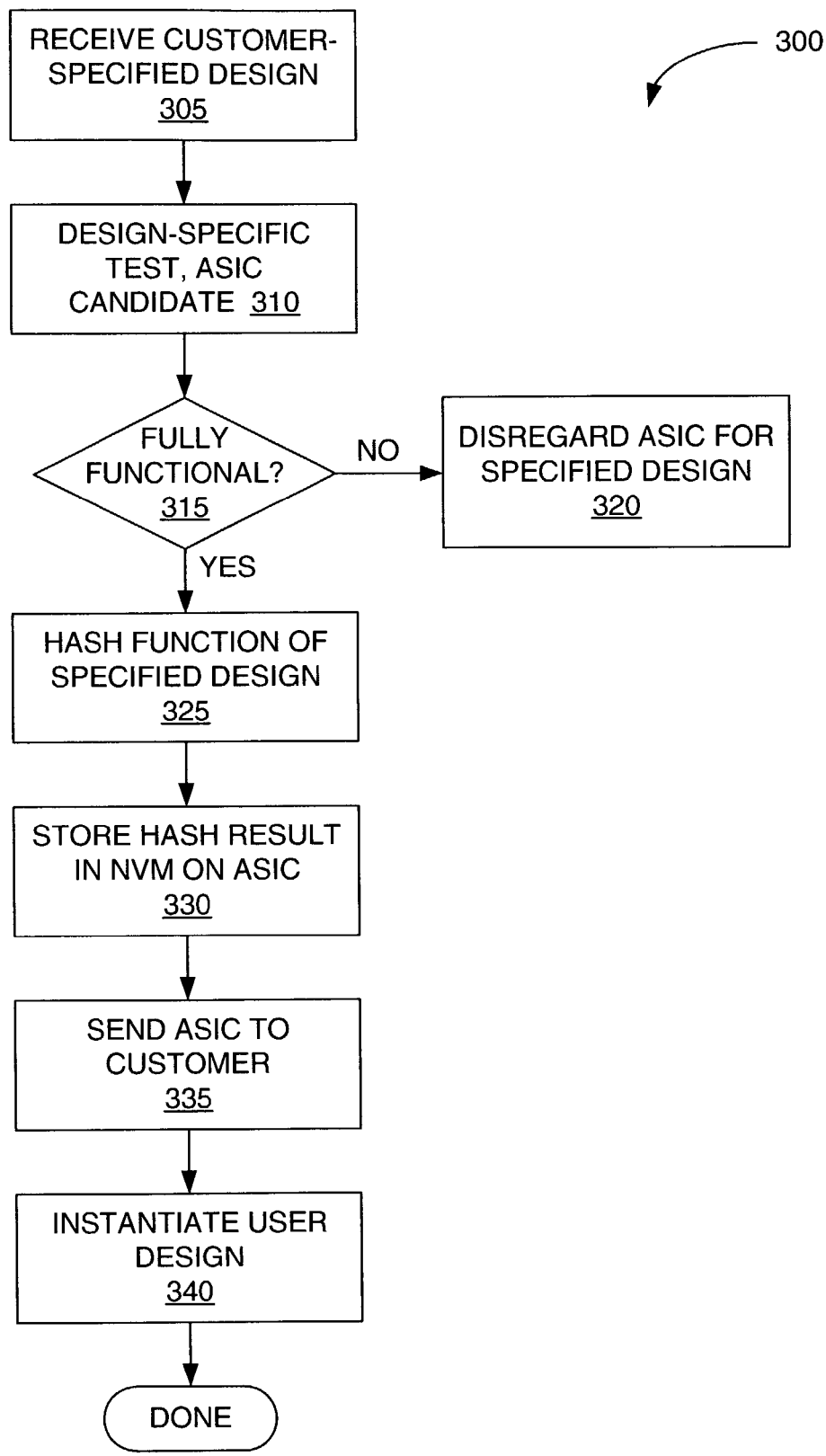
FIG. 3 is a flowchart 300 depicting the operation of an FGPA adapted in accordance with an embodiment of the invention.

FIG. 3 is a flowchart 300 depicting the operation of an FGPA adapted in accordance with an embodiment of the invention to include configuration logic 110 and memory 122 of FIGS. 1 and 2. Flowchart 300 is described in connection with FIG. 2 to illustrate how an embodiment of the invention facilitates dedicating programmable devices for use with one or more specific designs.

In the first step 305 the device manufacturer receives one or more user designs expressed using the appropriate design software. These designs are adapted for use in the type of PLD under test (e.g., a PLD of the same size and pin configuration). Design-specific tests are then employed to determine whether the PLD functions with a customer design (step 310). Such functionality is not unlikely, as customer designs typically leave a substantial portion of their programmable resources unused, and the defects in the PLD may be limited to these unused portions.

In decision 315, if the PLD under test is fully functional with a design of interest, the device is identified as acceptable for use with the particular design; otherwise, the PLD is disregarded for the specified design (step 320). When a device is identified as fully functional with a specified design, a hash function is performed, frame-by-frame, on the configuration data to be loaded into configuration memory 104 (step 325). The PLD vendor then stores the hash result, a unique identifier associated with the user design, within field 230 of non-volatile memory 122. At the same time, bit 232 is loaded with a logic one to enable design verification circuitry 130. The hash result, a 32-bit word in the example of FIG. 2, is then presented to the XOR gates within comparison circuit 238 (step 330).

Loading field 230 with the hash result and the enable bit dedicates FPGA 100 for use with designs that produce the hash result stored in field 230 when subjected to the hash function used in step 325. FPGA 100, thus dedicated, is then sent to the customer that specified the design (step 335). The customer can then instantiate the specified design on the dedicated FPGA (step 340), but will be unable to use the FPGA for other designs.

Figure 4:
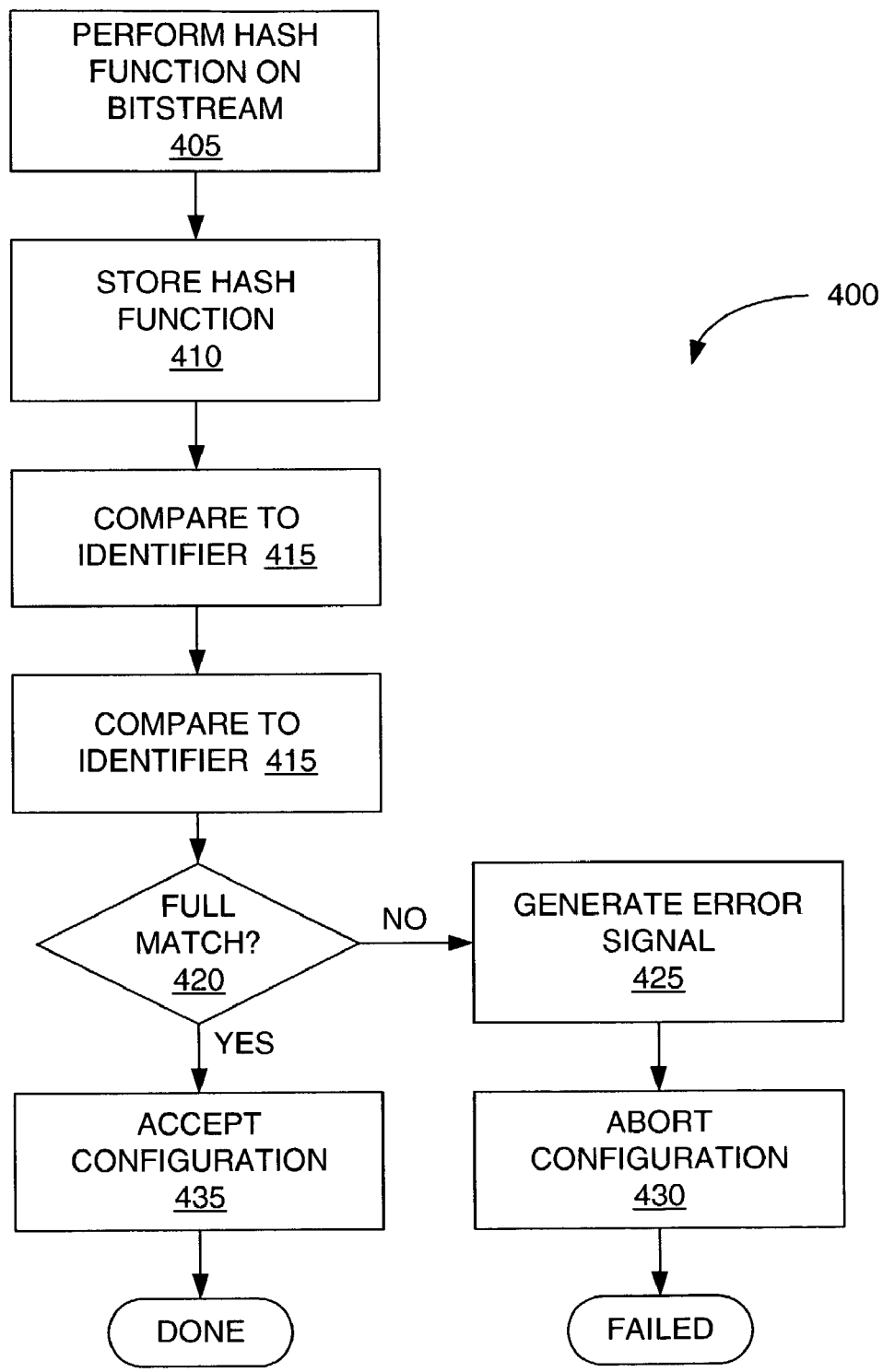
FIG. 4 is a flowchart 400 depicting the action after identification of a design in accordance with an embodiment of the invention.

FIG. 4 shows steps performed for assuring that only the designated bitstream will be used by the FPGA. Referring also to FIG. 2, the bitstream loaded into configuration logic 110 eventually produces a series of frames on bus 113. At step 405, hash logic 234 performs a hash function on the frames and at step 410 stores the resulting hash result in register 236. At the end of configuration, control logic 206 checks the signal ER to determine whether the allowed design has been loaded. At step 415, comparison circuit 238 compares the hash result in register 236 with the design-specific identifier in field 230. The XOR gate within comparison circuit 238 includes thirty-two output terminals and thirty-two pairs of input terminals. At step 420, any mismatch between corresponding bits of the hash results stored in field 230 and register 236 produces a logic one to an input of the OR gate in comparison circuit 238, and consequently provides a logic one on the second input of AND gate 240. At step 425, the output of AND gate 240 then transitions to a logic one, flagging an error to control logic 206. In response to the error signal, at step 430, control logic 206 aborts the configuration operation.

Aborting the configuration may occur in several ways. If the PLD includes CLBs that have outputs disabled during configuration, aborting may consist of keeping these outputs disabled after configuration. Or if the PLD has output drivers for I/O pins that are disabled during configuration, these output drivers may remain disabled. If the PLD brings a DONE pin high to indicate configuration is complete, the DONE pin may be held low after configuration is complete. If the PLD pulls interconnect lines to a single voltage during configuration, this state may be retained after configuration is complete. Most secure, if the PLD includes a global signal to clear configuration, this global signal may be activated to implement clearing the configuration. Only if a full match between the value calculated while loading a bitstream and a value stored in the PLD occurs will step 435 be taken to place the PLD into operation.

Hash functions are well known to those of skill in the art. For a more detailed discussion of how one might perform a hash function on a design to develop a unique identifier for the design, see U.S. application Ser. No. 09/253,401 entitled "Method and Apparatus for Protecting Proprietary Configuration Data for Programmable Logic Device," by Stephen M. Trimberger, which is incorporated herein by reference. In addition, "Applied Cryptography, Second Edition," (1996) by Schneier, beginning at page 456, describes a way to make a key-dependent one-way hash function by encrypting a message with a block algorithm in the CBC mode, as specified in ANSI X9.9, a United States national wholesale banking standard for authentication of financial transactions. ANSI X9.9 is incorporated herein by reference.

Design verification circuitry 130 verifies the configuration data presented to configuration memory 104 over bus 113.

In other embodiments, the design verification circuitry is adapted to verify incoming bitstreams. However, such embodiments may require field 230 be updated if the user changes decryption methods or keys. In still other embodiments, design verification circuitry 130 determines the length of incoming bitstreams by e.g. counting the number of words, bits, or frames. Design verification circuitry 130 then compares the resulting count against one or more allowed bitstream lengths. Bitstreams not matching the allowed lengths are rejected. Non-volatile memory 122 can be adapted to store values indicative of the allowed bitstream lengths.

Figure 5:
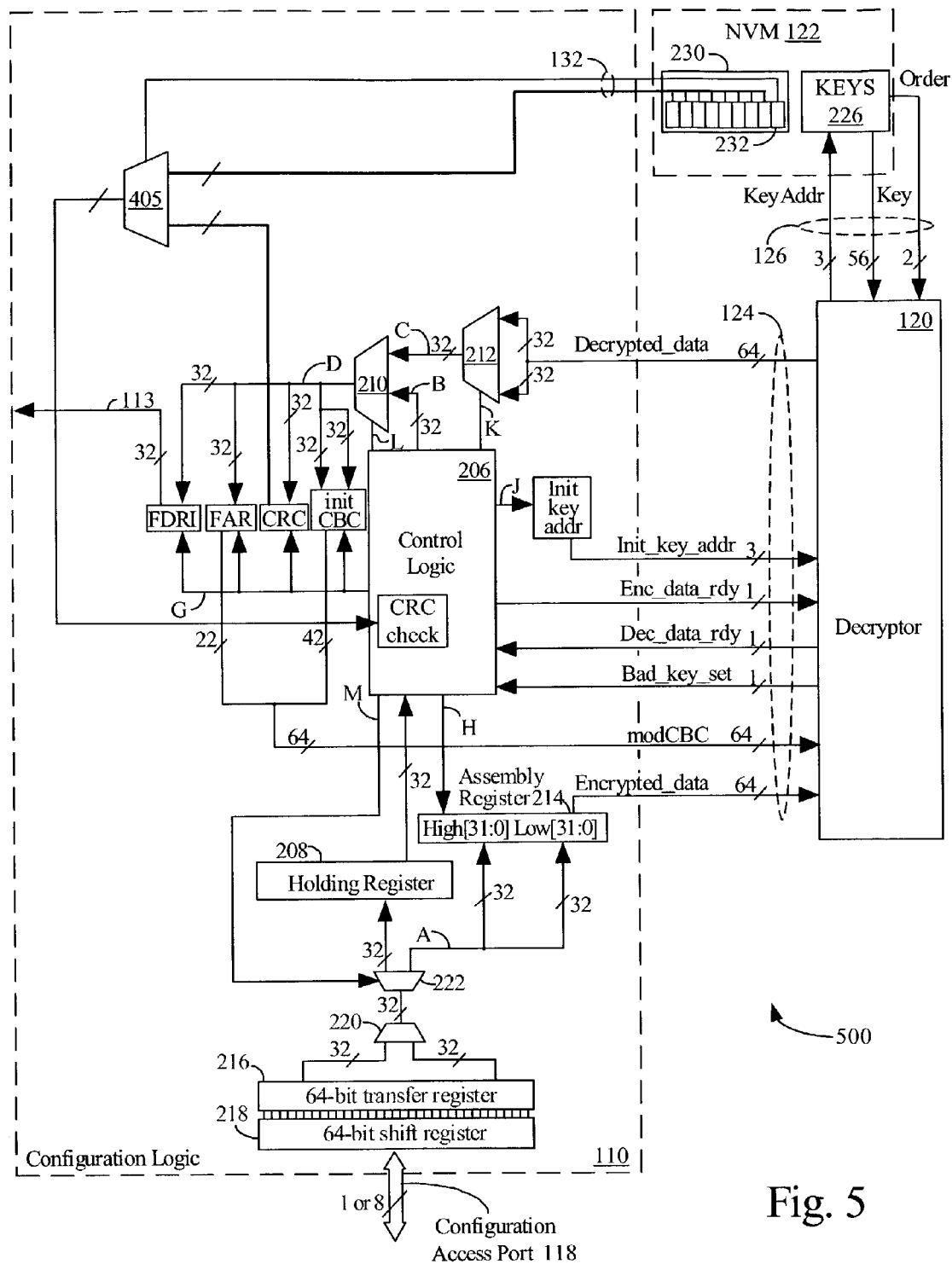
FIG. 5 is a block diagram detailing aspects of an FPGA 400 in accordance with another embodiment.

FIG. 5 is a block diagram detailing aspects of an FPGA 500 in accordance with another embodiment. FPGA 500 is similar to the FPGA of FIG. 2, like-numbered elements being the same. In place of design-verification circuitry 130, FPGA 400 includes a multiplexer 405 with (1) a control terminal connected to bit 232 within register 230, (2) a first input port connected to the remaining bits of register 230, and (3) a second input port connected to the CRC register on bus D.

Conventional FPGAs verify correct transmission of a configuration bitstream by computing a CRC value (a hash value) of the incoming bitstream and comparing the computed value with a second CRC value conveyed as part of the bitstream and stored in the CRC register. FPGA 500 performs this function if bit 232 of register 230 causes multiplexer 405 to pass the received CRC value in the CRC register to control logic 206 for comparison to a second CRC value calculated on-chip. FPGA 500 also supports a design-verification mode in which bit 232 within register 230 causes multiplexer 405 to compare the computed CRC value with a value stored in register 230. In this case, the CRC value required to verify the design is not conveyed to FPGA 500 as part of the bitstream. It is unlikely that any other design than the specified design will cause the two values to match and the design loaded into configuration memory 104 to become operational.

While the present invention has been described in connection with specific embodiments, variations of these embodiments will be obvious to those of ordinary skill in the art. For example, embodiments can include a plurality of memory fields to store a corresponding plurality of hash results to support more than one allowable configuration (e.g., the PLD might include hash results for both diagnostic circuitry and a user design). Moreover, a hash function is only one of many well-known methods of identifying patterns of data. Other methods for identifying patterns may alternatively be used. Therefore, the spirit and scope of the appended claims should not be limited to the foregoing description.

What is claimed is:

1. A programmable logic device comprising:
   a. programmable logic having defective portions;
   b. configuration memory connected via logic control lines to the programmable logic and adapted to control the function of the programmable logic; and
   c. configuration logic having:
      i. a memory access bus connected to the configuration memory;
      ii. at least one configuration access port adapted to receive expressions of customer-specific designs; and
      iii. design verification circuitry adapted to accept at least a given one of the expressions and to reject others of the expressions based on a unique signature of the given expression indicating the given expression can be instantiated into the configuration logic having the defective portions.

2. The programmable logic device of claim 1, further comprising a register adapted to store the unique signature.

3. The programmable logic device of claim 2, wherein the design verification circuitry comprises hash logic adapted to compute the unique signature.

4. The programmable logic device of claim 2, further comprising a memory adapted to identify the unique signature.

5. The programmable logic device of claim 4, wherein the memory is non-volatile.

6. The programmable logic device of claim 1, wherein the design verification circuitry can be disabled from accepting the others of the expressions.

7. The programmable logic device of claim 6, further comprising a non-volatile memory cell adapted to disable the design verification circuitry.

8. The programmable logic device of claim 1, further comprising a decryptor adapted to receive and decrypt an encrypted expression of a customer-specific design to provide a decrypted expression.

9. The programmable logic device of claim 8, wherein the design verification circuitry is adapted to identify at least a portion of the decrypted expression.

10. The programmable logic device of claim 1, wherein the expressions are configuration bitstreams, and wherein the design verification circuitry accepts bitstreams of at least one allowed length.

11. The programmable logic device of claim 10, further comprising memory adapted to store values indicative of the allowed length.

12. The programmable logic device of claim 10, wherein there is only one allowed length.

* * * * *